United States Patent
Lee

(10) Patent No.: US 11,381,088 B2
(45) Date of Patent: Jul. 5, 2022

(54) GATEWAY APPARATUS FOR CONTROLLING POWER OF PHOTOVOLTAIC POWER GENERATION FACILITIES

(71) Applicant: SUNG CHANG CO., LTD, Chungcheongbuk-do (KR)

(72) Inventor: Jae Jin Lee, Chungcheongbuk-do (KR)

(73) Assignee: SUNG CHANG CO., LTD, Chungcheongbuk-Do (KR)

( * ) Notice: Subject to any disclaimer, the term of this patent is extended or adjusted under 35 U.S.C. 154(b) by 263 days.

(21) Appl. No.: 16/831,981

(22) Filed: Mar. 27, 2020

(65) Prior Publication Data

US 2021/0066919 A1 Mar. 4, 2021

(30) Foreign Application Priority Data

Aug. 30, 2019 (KR) .................. 10-2019-0107499

(51) Int. Cl.
*H02J 13/00* (2006.01)
*H02J 3/38* (2006.01)
*G05B 19/042* (2006.01)

(52) U.S. Cl.
CPC .......... *H02J 3/381* (2013.01); *G05B 19/0423* (2013.01); *H02J 13/00026* (2020.01); *G05B 2219/25186* (2013.01); *H02J 2300/26* (2020.01)

(58) Field of Classification Search
CPC .. H02J 3/381; H02J 13/00026; H02J 2300/26; H02J 7/35; H02J 2300/24;
(Continued)

(56) References Cited

U.S. PATENT DOCUMENTS

| 2009/0010233 A1* | 1/2009 | Pratt, Jr. | G01D 21/00 370/338 |
| 2013/0297084 A1* | 11/2013 | Kubota | H02J 3/14 700/286 |

FOREIGN PATENT DOCUMENTS

| KR | 10-2012-0074594 A | 7/2012 |
| KR | 10-1776160 B1 | 9/2017 |

OTHER PUBLICATIONS

Farihah Shariff, Nasrudin Abd Rahim, Wooi Ping Hew, Zigbee-based data acquisition system for online monitoring of grid-connected photovoltaic system, Expert Systems with Applications, vol. 42, Issue 3, 2015, pp. 1730-1742 (Year: 2015).*

(Continued)

*Primary Examiner* — Christopher E. Everett
(74) *Attorney, Agent, or Firm* — Harness, Dickey & Pierce, P.L.C.

(57) ABSTRACT

Disclosed is a gateway apparatus for photovoltaic power generation facilities. The gateway apparatus includes a first communication portion which performs short-range wireless communication with at least one of a photovoltaic module connection board, a photovoltaic inverter, a peripheral environment sensing apparatus, a power measuring apparatus, and an energy storage system (ESS), a second communication portion which performs wired communication or wireless communication with a remote server, and a control portion which controls operations of the first communication portion and the second communication portion. Here, the control portion controls information provided from one or more of the photovoltaic module connection board, the photovoltaic inverter, the peripheral environment sensing apparatus, and the power measuring apparatus to be transmitted to the ESS.

6 Claims, 3 Drawing Sheets

(58) Field of Classification Search
CPC ............. H02J 2300/22; G05B 19/0423; G05B 2219/25186; G05B 19/042; Y02E 10/56; Y02E 40/70; Y02E 60/00; Y04S 10/123; Y04S 40/126; Y04S 10/14; H02S 10/00
See application file for complete search history.

(56) References Cited

OTHER PUBLICATIONS

M. Benghanem, "Measurement of meteorological data based on wireless data acquisition system monitoring," Applied Energy, vol. 86, Issue 12, 2009, pp. 2651-2660 (Year: 2009).*
Xiaoli, Xu, and Wang Huan. "The Wireless Sensor Network Construction of the Photovoltaic Power System Zig Bee." Procedia Engineering 15 (2011): 2511-2515. (Year: 2011).*
Belghith, Oussama Ben, and Lasaad Sbita. "Remote GSM module monitoring and Photovoltaic system control." In 2014 First International Conference on Green Energy ICGE 2014, pp. 188-192. IEEE, 2014. (Year: 2014).*
M. E. Andreoni López, F. J. Galdeano Mantiñan and M. G. Molina, "Implementation of wireless remote monitoring and control of solar photovoltaic (PV) system," 2012 Sixth IEEE/PES Transmission and Distribution: Latin America Conference and Exposition (T&D-LA), 2012, pp. 1-6. (Year: 2012).*
Office Action from corresponding Korean Patent Application No. 10-2019-0107499, dated Nov. 27, 2020.

\* cited by examiner

GATEWAY APPARATUS FOR CONTROLLING POWER OF PHOTOVOLTAIC POWER GENERATION FACILITIES

CROSS-REFERENCE TO RELATED APPLICATION

This application claims priority to and the benefit of Korean Patent Application No. 10-2019-107499, filed on Aug. 30, 2019, the disclosure of which is incorporated herein by reference in its entirety.

FIELD

The present invention relates to a technique for controlling photovoltaic power generation facilities, and more particularly, to a gateway apparatus for controlling power of photovoltaic power generation facilities, capable of easily obtaining information for controlling the photovoltaic power generation facilities using short-range wireless communication.

BACKGROUND

A photovoltaic power generation system is being noticed as one of measures of activating new renewable energy, and a system capable of managing the photovoltaic power generation system exists.

However, since inverters connected to photovoltaic power generation facilities are generally located at distant places, it is difficult to instantaneously check an operation status or troubles at a spot and there are many limitations in access thereto. In related arts, system-connected large-capacity inverters are mainly managed for monitoring photovoltaic power generation facilities, and module inverters or small-capacity inverters of 5 Kw are hardly monitored.

Also, since it has been a recent trend to pursue large-scaled power generation using small-capacity inverters which are conveniently managed in comparison to large-scaled inverters, it is necessary to efficiently manage photovoltaic power generation according thereto and a monitoring method appropriate for low-cost large-capacity is necessary.

Particularly, in related arts, since a remote terminal unit (RTU) connected to an inverter, a peripheral environment sensor, a watt-hour meter, an energy storage system, and the like among photovoltaic power generation facilities over wires for access thereto and monitoring the same collects information, there is a problem that a time delay occurs in collecting information for real-time controlling photovoltaic power generation facilities.

RELATED ART DOCUMENT

[Patent Document]
(Patent Document 0001) Korean Patent Registration No. 10-1776160 (published on Sep. 8, 2017)

SUMMARY

The present invention is directed to providing a gateway apparatus for controlling power of photovoltaic power generation facilities, capable of easily obtaining information for controlling the photovoltaic power generation facilities using short-range wireless communication.

According to an embodiment of the present invention, there is provided a gateway apparatus for photovoltaic power generation facilities. The gateway apparatus includes a first communication portion which performs short-range wireless communication with at least one of a photovoltaic module connection board, a photovoltaic inverter, a peripheral environment sensing apparatus, a power measuring apparatus, and an energy storage system (ESS), a second communication portion which performs wired communication or wireless communication with a remote server, and a control portion which controls operations of the first communication portion and the second communication portion. Here, the control portion controls information provided from one or more of the photovoltaic module connection board, the photovoltaic inverter, the peripheral environment sensing apparatus, and the power measuring apparatus to be transmitted to the ESS.

The first communication portion may include communication modules which support one or more of WIFI communication, Bluetooth communication, Zigbee communication, Z-wave communication, long range (LoRa) communication, SIGFOX communication, long-term evolution machine-type communications (LTE-MTC) communication, and narrow band Internet of things (NB-IoT) communication.

The first communication portion may receive direct current (DC) power source information from the photovoltaic module connection board, power information from the photovoltaic inverter, an atmosphere temperature, a wind speed, a wind direction, light intensity, an atmospheric pressure, and the like around the photovoltaic power generation facilities from the peripheral environment sensing apparatus, and information on a DC power source or an alternating current (AC) power source generated or converted by a photovoltaic module from the power measuring apparatus through a wireless local area network (WLAN). Also, the first communication portion may transmit the information received from the photovoltaic module connection board, the photovoltaic inverter, the peripheral environment sensing apparatus, and the power measuring apparatus to the ESS through the WLAN.

The second communication portion may include communication modules which support one or more of Ethernet communication, LTE communication, 5G communication, LoRa communication, SIGFOX communication, LTE-MTC communication, and NB-IoT communication.

The second communication portion may transmit DC power source information provided from the photovoltaic module connection board, power information provided from the photovoltaic inverter, an atmosphere temperature, a wind speed, a wind direction, light intensity, an atmospheric pressure, and the like around the photovoltaic power generation facilities provided from the peripheral environment sensing apparatus, information on a DC power source or an AC power source generated or converted by a photovoltaic module provided from the power measuring apparatus, and information on charged or discharged power provided from the ESS to the remote server through a wide area network.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, an exemplary embodiment of the present invention will be described in detail with reference to the attached drawings.

Embodiments of the present invention are provided to more completely explain the present invention to one of ordinary skill in the art. The embodiments of the present invention may be changed in a variety of shapes, and the scope of the present invention is not limited to the following embodiments. The embodiments are provided to make the present disclosure more substantial and complete and to completely transfer the concept of the present invention to those skilled in the art.

The terms are used herein to explain particular embodiments and not intended to limit the present invention. As used herein, singular expressions, unless clearly defined otherwise in context, include plural expressions. Also, as used herein, the term "and/or" includes any and all combinations of one or a plurality of associated listed items.

Figure 1:
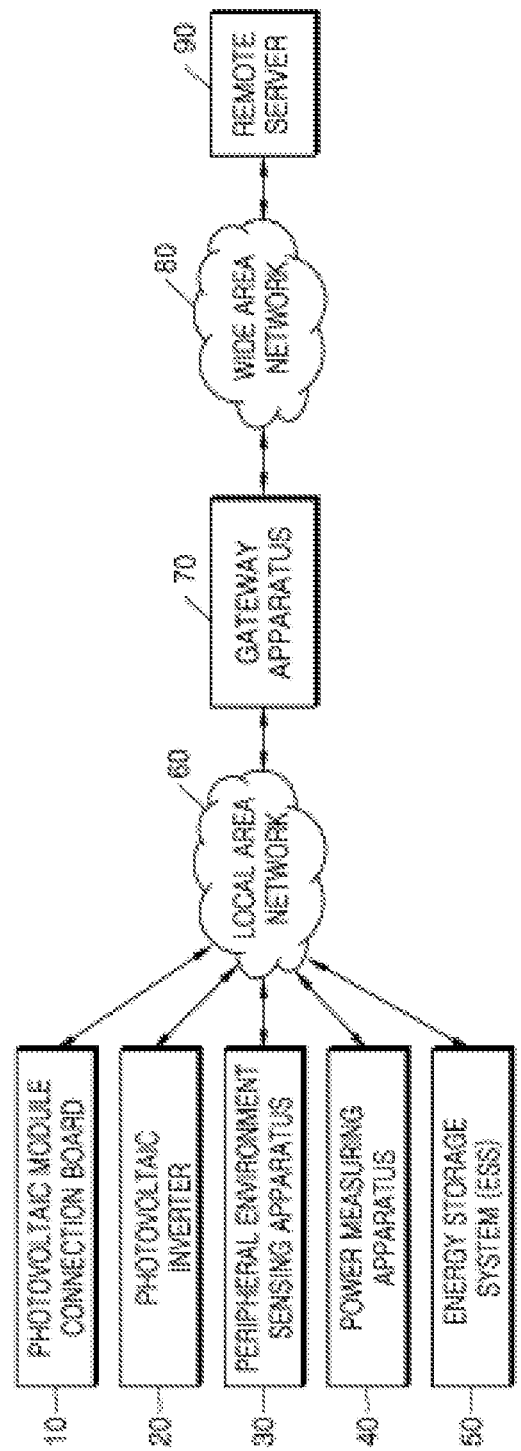
FIG. 1 is a reference view illustrating a network environment for controlling power of photovoltaic power generation facilities according to the present invention.
Figure 2:
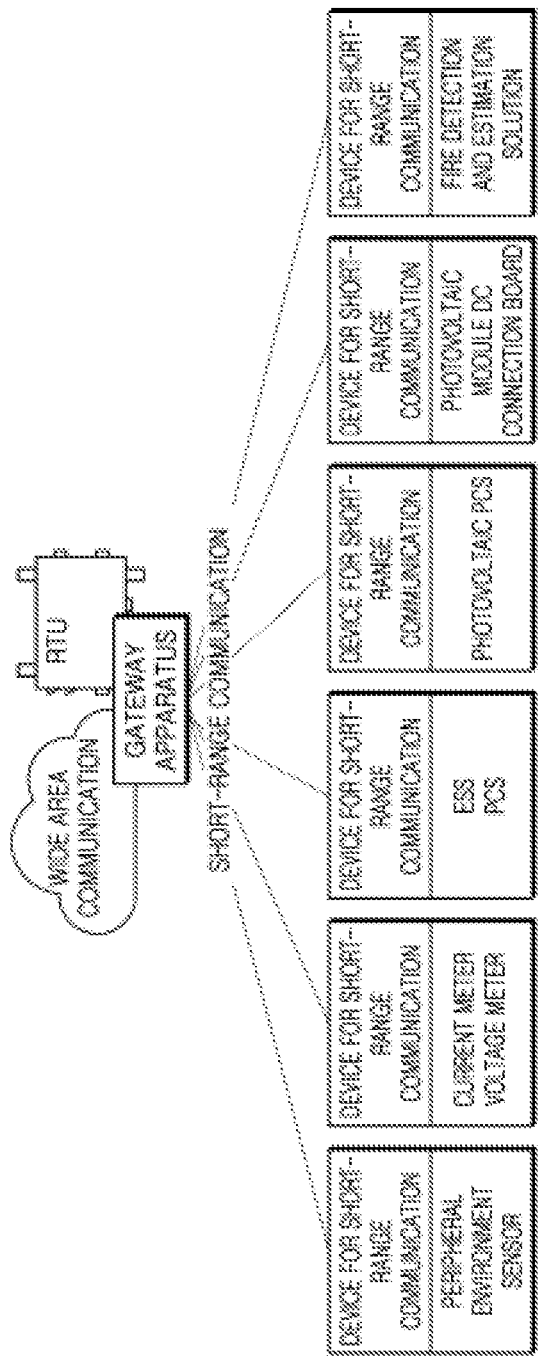
FIG. 2 is a reference view illustrating a network connection state on the basis of a gateway apparatus in the network environment of FIG. 1.

FIG. 1 is a reference view illustrating a network environment for controlling power of photovoltaic power generation facilities according to the present invention, and FIG. 2 is a reference view illustrating a network connection state on the basis of a gateway apparatus in the network environment of FIG. 1.

Referring to FIG. 1, elements which form the network environment for controlling power of photovoltaic power generation facilities may include a photovoltaic module connection board 10, a photovoltaic inverter 20, a peripheral environment sensing apparatus 30, a power measuring apparatus 40, an energy storage system (ESS) 50, a local area network (LAN) 60, a gateway apparatus 70, a wide area network (WAN) 80, and a remote server 90.

The photovoltaic module connection board 10 includes a reverse voltage prevention module including a reverse voltage preventing diode configured to protect a circuit of an input terminal by cutting off a current flowing reversely on a photovoltaic module, a current measuring sensor configured to monitor whether a power generation state is normal by detecting a voltage and a current of power generated using a solar cell panel, an overcurrent prevention fuse configured to protect a circuit by cutting off an overcurrent, and the like.

The photovoltaic module connection board 10 includes a wireless communication module for short-range wireless communication with the gateway apparatus 70. Accordingly, the photovoltaic module connection board 10 may transmit a sensing signal with respect to a sensed power voltage or current with respect to the photovoltaic module to the gateway apparatus 70 through the LAN in real time or after a certain time delay.

The photovoltaic inverter 20 converts direct current (DC) power (or a DC voltage/DC current) provided by the photovoltaic module into alternating current (AC) power (or an AC voltage/AC current). The photovoltaic inverter 20 provides AC power to a system (or load).

The photovoltaic inverter 20 converts a DC power source generated by and transmitted from the photovoltaic module into an AC power source. To this end, the photovoltaic inverter 20 may include a plurality of switching elements and a system-connected filter. The plurality of switching elements convert input DC voltages into AC voltages through conversion between on or off states on the basis of a control signal. The system-connected filter includes a power converter, a system side inductor, and a filter capacitor. Also, the photovoltaic inverter 20 may include a control module which performs maximum power point tracking (MPPT) or pulse width modulation (PWM) control and sets and controls a driving time to suit circumstances. Also, the photovoltaic inverter 20 may include a photovoltaic power conversion system (PCS), and the photovoltaic PCS may convert the AC power source into a DC power source to store the DC power source in the ESS 50.

Particularly, in addition to an operation of converting an existing DC into AC, the photovoltaic inverter 20 may transmit real-time power generation information, accumulated power generation information, power generation state information, inverter operation state information, and the like to the gateway apparatus 70. To this end, the photovoltaic inverter 20 includes a wireless communication module for short-range wireless communication with the gateway apparatus 70. Accordingly, the photovoltaic inverter 20 may transmit state information on power conversion to the gateway apparatus 70 through the LAN. When an inverter status information request signal is received from the gateway apparatus 70, the photovoltaic inverter 20 transmits information on a DC voltage and current input to an input terminal, an AC voltage and current output from an output terminal, an AC voltage frequency, and the like to the gateway apparatus 70 through the LAN in real time or after a certain time delay.

The peripheral environment sensing apparatus 30 senses information on an atmosphere temperature, a wind velocity, a wind direction, light intensity, an atmospheric pressure, and the like as peripheral environments of the photovoltaic power generation facilities. To this end, the peripheral environment sensing apparatus 30 may include a temperature sensor, a wind velocity sensor, a wind direction sensor, a light intensity sensor, an atmospheric pressure sensor, and the like.

Particularly, the peripheral environment sensing apparatus 30 may transmit atmosphere temperature information, wind velocity information, wind direction information, light intensity information, atmospheric pressure information, and the like sensed by the temperature sensor, the wind velocity sensor, the wind direction sensor, the light intensity sensor, the atmospheric pressure sensor, and the like to the gateway apparatus 70. To this end, the peripheral environment sensing apparatus 30 includes a wireless communication module for short-range wireless communication with the gateway apparatus 70. Accordingly, the peripheral environment sensing apparatus 30 may transmit the temperature information, the wind velocity information, the wind direction information, the light intensity information, the atmospheric pressure information, and the like, which are sensed, to the gateway apparatus 70 through the LAN in real time or after a certain time delay.

The power measuring apparatus 40 measures a capacity of AC power supplied from the photovoltaic inverter 20, a capacity of system power supplied from a power system, or load power consumed by a load.

The power measuring apparatus 40 may be formed at an output terminal of the PCS of the photovoltaic module and measure a quantity of power generated by the photovoltaic module. The power measuring apparatus 40 may include a DC power source measuring apparatus and an AC power source measuring apparatus.

The DC power source measuring apparatus includes a DC power generation current sensor, which measures DC power generation power generated from the photovoltaic module to measure a DC power generation current, and a DC current measuring circuit which measures a DC power generation current by measuring a DC power generation current signal output from the DC power generation current sensor. Also, the DC power source measuring apparatus includes a DC power generation voltage sensor, which measures a DC power generation voltage generated by the photovoltaic module, and a DC voltage measuring circuit which measures a DC power generation voltage by measuring a DC power generation voltage signal output from the DC power generation voltage sensor.

The AC power source measuring apparatus includes an AC power generation current sensor, which measures AC power generation power output from the photovoltaic inverter 20 to measure an AC power generation current, and an AC current measuring circuit which measures an AC generation current by measuring an AC power generation current signal output from the AC power generation current sensor. Also, the AC power source measuring apparatus includes an AC power generation voltage sensor configured to measure an AC power generation voltage and an AC voltage measuring circuit which measures an AC power generation voltage by measuring an AC power generation voltage signal output from the AC power generation voltage sensor.

Particularly, the power measuring apparatus 40 may transmit information on a DC current, a DC voltage, an AC current, an AC voltage, and the like, which are measured, to the gateway apparatus 70. To this end, the power measuring apparatus 40 includes a wireless communication module for short-range wireless communication with the gateway apparatus 70. Accordingly, the power measuring apparatus 40 may transmit information on a DC current, a DC voltage, an AC current, an AC voltage, and the like, which are measured, to the gateway apparatus 70 through the LAN in real time or after a certain time delay.

The ESS 50 is an apparatus installed in power generation, transmission and distribution, and the like in the power system and configured to perform functions such as frequency regulation, stabilization of output from a generator using new renewable energy, peak shaving, load leveling, an emergency power source, and the like. To this end, the ESS 50 stores information for energy storage. That is, the energy storage information includes information on a type and a charge time of a battery with variable volumetric efficiency according to a power level during charge/discharge.

Also, the ESS 50 may include an ESS-PCS, and the ESS-PCS is allowed to convert a DC power source stored in the ESS 50 into an AC power source and to supply the AC power source to a load.

Particularly, the ESS 50 may perform short-range wireless communication with the gateway apparatus 70 to collect information provided from the photovoltaic module connection board 10, the photovoltaic inverter 20, the peripheral environment sensing apparatus 30, the power measuring apparatus 40, and the like. To this end, the ESS 50 includes a wireless communication module for short-range wireless communication with the gateway apparatus 70. Accordingly, the ESS 50 may receive DC power source information of the photovoltaic module connection board 10, AC power source information of the photovoltaic inverter 20, peripheral environment sensing information of the peripheral environment sensing apparatus 30, DC or AC power information of the power measuring apparatus 40, and the like from the gateway apparatus 70 through the LAN in real time or after a certain time delay.

The LAN 60 is a communication network which provides a network environment to allow the photovoltaic module connection board 10, the photovoltaic inverter 20, the peripheral environment sensing apparatus 30, the power measuring apparatus 40, and the ESS 50 to perform short-range wireless communication with the gateway apparatus 70.

The LAN 60 may include a WIFI communication network, a Bluetooth communication network, a Zigbee communication network, a Z-wave communication network, an SIGFOX communication network, a narrow band Internet of things (NB-IoT) communication network, a long-term evolution machine-type communications (LTE-MTC) communication network, and the like. Particularly, the NB-IoT communication network, a long-range (LoRa) communication network, the SIGFOX communication network, and the LTE-MTC communication network correspond to a wireless WAN (WAN) with less power consumption, as a low-power wide-area network (LPWAN), which has a wide-area service coverage of ten km or more and provides a maximum communication speed of several hundred kilobits per second (kbps) or less. Accordingly, when one of such LPWANs is used, it is necessary to transmit data scattered throughout a relatively wide area using low power.

The gateway apparatus 70 transmits or receives information on the photovoltaic module connection band 10, the photovoltaic inverter 20, the peripheral environment sensing apparatus 30, the power measuring apparatus 40, the ESS 50, and the like and transmits the transmitted or received information to the ESS 50 through the LAN 60 or transmits the transmitted or received information to the remote server 90 through the WAN 80. Details of the gateway apparatus 70 will be described below.

The WAN 80 is a communication network which provides a network environment to allow the gateway apparatus 70 and the remote server 90 to perform wide area communication therebetween. The WAN 80 may include an Ethernet communication network, an LTE communication network, a 5G communication network, an LoRa communication network, an SIGFOX communication network, an NB-IoT communication network, an LTE-MTC communication network, and the like.

The remote server 90 is connected to the gateway apparatus 70 through the WAN 80 over wires or wirelessly. Accordingly, the remote server 90 may transmit a signal for controlling or monitoring the photovoltaic module connection board 10, the photovoltaic inverter 20, the peripheral environment sensing apparatus 30, the power measuring apparatus 40, or the ESS 50 to the corresponding apparatus, may collect a monitoring signal or response signal provided from the corresponding apparatus through the gateway apparatus 70 and the WAN 80, and may remotely control monitoring and management with respect to the photovoltaic power generation facilities using the collected information.

Figure 3:
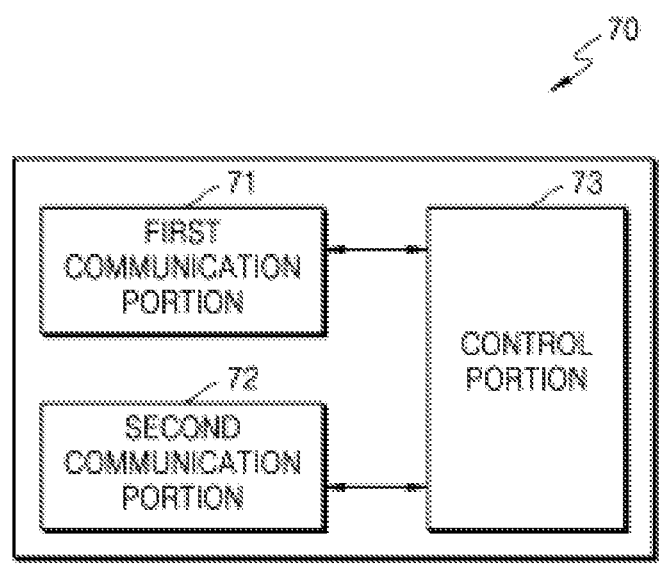
FIG. 3 is a configuration block diagram illustrating one embodiment of a gateway apparatus 70 for controlling power of the photovoltaic power generation facilities shown in FIG. 1.

FIG. 3 is a configuration block diagram illustrating one embodiment of the gateway apparatus 70 for controlling power of the photovoltaic power generation facilities shown in FIG. 1.

Referring to FIG. 3, the gateway apparatus 70 includes a first communication portion 71, a second communication portion 72, and a control portion 73.

The first communication portion 71 performs short-range wireless communication with at least one of the photovoltaic module connection board 10, the photovoltaic inverter 20, the peripheral environment sensing apparatus 30, the power measuring apparatus 40, and the ESS 50. To this end, the first communication portion 71 includes a communication module which supports each of WIFI communication, Bluetooth communication, Zigbee communication, Z-wave communication, LoRa communication, SIGFOX communication, LTE-MTC communication, NB-IoT communication, and the like.

For example, the first communication portion 71 receives DC power source information from the photovoltaic module connection board 10, AC conversion power information from the photovoltaic inverter 20, an atmosphere temperature, a wind speed, a wind direction, light intensity, an atmospheric pressure, and the like around the photovoltaic power generation facilities from the peripheral environment sensing apparatus 30, information on a DC power source or an AC power source generated or converted by the photovoltaic module from the power measuring apparatus 40 through a wireless LAN (WLAN).

Also, the first communication portion 71 may transmit information provided from the photovoltaic module connection board 10, the photovoltaic inverter 20, the peripheral environment sensing apparatus 30, the power measuring apparatus 40, and the like to the ESS 50 through the WLAN. Also, the first communication portion 71 may receive information on charged and discharged power collected by the ESS 50 from ESS 50.

Also, the first communication portion 71 may transmit a signal for monitoring or controlling, by the remote server 90, the photovoltaic module connection board 10, the photovoltaic inverter 20, the peripheral environment sensing apparatus 30, the power measuring apparatus 40, the ESS 50, or the like to each corresponding apparatus through the WLAN.

The second communication portion 72 performs wireless communication or wireless communication with the remote server 90. To this end, the second communication portion 72 includes a communication module which supports each of Ethernet communication, LTE communication, 5G communication, LoRa communication, SIGFOX communication, NB-IoT communication, LTE-MTC communication, and the like.

For example, the second communication portion 72 transmits information such as DC power source information provided from the photovoltaic module connection board 10, AC converted power information provided from the photovoltaic inverter 20, information on an atmosphere temperature, a wind speed, a wind direction, light intensity, an atmospheric pressure, and the like around the photovoltaic power generation facilities provided from the peripheral environment sensing apparatus 30, information on a DC power source or an AC power source generated or converted by the photovoltaic module provided from the power measuring apparatus 40, or information on charged or discharged power provided from the ESS 50 to the remote server 90 through the WAN 80 over wires or wirelessly.

Also, the second communication portion 72 may transmit a signal for monitoring or controlling, by the remote server 90, the photovoltaic module connection board 10, the photovoltaic inverter 20, the peripheral environment sensing apparatus 30, the power measuring apparatus 40, the ESS 50, or the like through the WAN 80.

The control portion 73 controls information transmission and reception operations of the first communication portion 71 and the second communication portion 72. The control portion 73 performs an operation of controlling the first communication portion 71 and the second communication portion 72 according to a control signal or a monitoring signal received from the remote server 90.

For example, the control portion 73 controls an operation of the first communication portion 71 to receive information provided from the photovoltaic module connection board 10, the photovoltaic inverter 20, the peripheral environment sensing apparatus 30, or the power measuring apparatus 40 through short-range wireless communication.

Afterwards, the control portion 73 controls the operation of the first communication portion 71 to transmit information provided from the photovoltaic module connection board 10, the photovoltaic inverter 20, the peripheral environment sensing apparatus 30, or the power measuring apparatus 40 to the ESS 50. Accordingly, information collected from the photovoltaic module connection board 10, the photovoltaic inverter 20, the peripheral environment sensing apparatus 30, or the power measuring apparatus 40 may be transmitted to the ESS 50 in real time or after a certain time delay.

Also, the control portion 73 controls an operation of the second communication portion 72 to transmit the information collected from the photovoltaic module connection board 10, the photovoltaic inverter 20, the peripheral environment sensing apparatus 30, the power measuring apparatus 40, or the ESS 50 to the remote server 90 according to a control signal or a monitoring signal of the remote server 90. Accordingly, the information collected from the photovoltaic module connection board 10, the photovoltaic inverter 20, the peripheral environment sensing apparatus 30, the power measuring apparatus 40, or the ESS 50 may be transmitted to the remote server 90 through the WAN 80 in real time or after a certain time delay.

According to the embodiment of the present invention, it is possible to collect information for controlling photovoltaic power generation facilities in real time by collecting related information by through direct WLAN with at least one of a photovoltaic module connection board, a photovoltaic inverter, a peripheral environment sensing apparatus, a power measuring apparatus, and an ESS and transmitting the collected information to the ESS.

Accordingly, it is possible to prevent a time delay in controlling the photovoltaic power generation facilities in the ESS. That is, it is possible to quickly perform power control by directly collecting information from the photovoltaic inverter or the photovoltaic module connection board through a gateway apparatus rather than reading, by the ESS, a watt-hour meter on a line of the photovoltaic power generation facilities.

Also, the remote server may quickly collect information for controlling operations of the photovoltaic module connection board, the photovoltaic inverter, the peripheral environment sensing apparatus, the power measuring apparatus, and the ESS, and a control signal therefore may be quickly transmitted or received.

The embodiment of the present invention has been described above. It should be understood by one of ordinary skill in the art that modifications may be made without departing from the essential features of the present invention. Therefore, the disclosed embodiment should be considered not in a limitative view but in a descriptive view.

Accordingly, it should be construed that the scope of the present invention is not limited to the above embodiment and a variety of modifications may be included within the range of the content disclosed in the claims and equivalents thereof.

What is claimed is:

1. A gateway apparatus for photovoltaic power generation facilities, comprising:
   a first communication portion configured to perform short-range wireless communication with
      a photovoltaic module connection board,
      a photovoltaic inverter,
      a peripheral environment sensing apparatus,
      a power measuring apparatus, and
      an energy storage system (ESS),
      wherein the first communication portion is configured to
         receive at least peripheral environment information from the peripheral environment sensing apparatus and
         transmit at least the peripheral environment information to the ESS;
   a second communication portion configured to perform wired communication or wireless communication with a remote server; and
   a control portion configured to control operations of the first communication portion and the second communication portion,
   wherein the control portion is configured to control the first communication portion to transmit the peripheral environment information, provided from the peripheral environment sensing apparatus, to the ESS.

2. The gateway apparatus of claim 1, wherein the first communication portion comprises one or more communication modules which configured to support one or more of Bluetooth communication, Zigbee communication, Z-wave communication, long range (LoRa) communication, SIGFOX communication, long-term evolution machine-type communication (LTE-MTC), and narrow band Internet of things (NB-loT) communication.

3. The gateway apparatus of claim 1, wherein the first communication portion is configured to receive direct current (DC) power source information from the photovoltaic module connection board, power information from the photovoltaic inverter, the peripheral environment information from the peripheral environment sensing apparatus, and information on a DC power source or an alternating current (AC) power source generated or converted by a photovoltaic module from the power measuring apparatus through a wireless local area network (WLAN), and
   wherein the first communication portion is configured to transmit the direct current (DC) power source information received from the photovoltaic module connection board, the power information received from the photovoltaic inverter, the peripheral environment information received from the peripheral environment sensing apparatus, and the information received from the power measuring apparatus to the ESS through the WLAN.

4. The gateway apparatus of claim 1, wherein the second communication portion comprises one or more communication modules which configured to support one or more of Ethernet communication, LTE communication, 5G communication, LoRa communication, SIGFOX communication, LTE-MTC communication, and NB-loT communication.

5. The gateway apparatus of claim 1, wherein the second communication portion is configured to transmit DC power source information provided from the photovoltaic module connection board, power information provided from the photovoltaic inverter, the peripheral environment information provided from the peripheral environment sensing apparatus, information on a DC power source or an AC power source generated or converted by a photovoltaic module provided from the power measuring apparatus, and information on charged or discharged power provided from the ESS to the remote server through a wide area network.

6. The gateway apparatus of claim 1, wherein the peripheral environment information includes at least one or more of an atmosphere temperature, a wind speed, a wind direction, light intensity, and an atmospheric pressure.

* * * * *